United States Patent [19]

Malcolm et al.

[11] 4,397,555

[45] Aug. 9, 1983

[54] ARTIFICIAL HORIZON DEVICE

[75] Inventors: Richard E. Malcolm, Oakville; Harry M. Assenheim, Georgetown; Paul L. Emmett, Willowdale; Richard Chan, Brampton, all of Canada

[73] Assignee: Her Majesty the Queen in right of Canada, as represented by the Minister of National Defence, Ottawa, Canada

[21] Appl. No.: 211,954

[22] Filed: Dec. 1, 1980

[30] Foreign Application Priority Data

Oct. 20, 1980 [CA] Canada .................................. 362778

[51] Int. Cl.³ ............................................. G01C 9/02
[52] U.S. Cl. .................................... 356/248; 350/6.6; 350/486
[58] Field of Search ................. 356/248; 350/6.6, 6.91, 350/486

[56] References Cited

U.S. PATENT DOCUMENTS 3,315,563   4/1967   Harper et al. ........................ 350/486
4,083,239   4/1978   Malcolm et al. ............... 356/252 X

FOREIGN PATENT DOCUMENTS 52-30449   3/1977   Japan .................................... 350/6.6

OTHER PUBLICATIONS

Jablonowski et al., "Galvanometer Deflection: A Precision High-Speed System," *Applied Optics*, vol. 15, No. 6, pp. 1437–1443, Jun. 1976.

Primary Examiner—John K. Corbin
Assistant Examiner—Matthew W. Koren
Attorney, Agent, or Firm—Hirons, Rogers & Scott

[57] ABSTRACT

The invention provides an artificial horizon device having a light source of limited power which can be positioned remotely from the aircraft cockpit. A scanning mechanism is mounted in the cockpit to receive light from the light source and to project a light bar representing the true horizon by scanning a projected light beam along the perceived bar at a frequency sufficiently high that the bar is perceived as a continuous projection.

7 Claims, 14 Drawing Figures

ARTIFICIAL HORIZON DEVICE

This invention relates to artificial horizon devices of the type used to project a line of light or light bar in front of a pilot and to control the location and attitude of the line to simulate the true horizon.

For the purposes of this application the word "aircraft" is intended to include flight simulators and craft generally which move in three dimensions.

Conventional aircraft instruments include a device which indicates the orientation of the aircraft relative to a horizon. The instrument is located in the cockpit where the pilot can inspect it periodically to determine the attitude of the aircraft when the horizon is not visible to the pilot. This requires the pilot to use central vision which encompasses a solid angle of about 3 degrees directly in front of the eyes.

Central vision regards an instrument such as the artificial horizon as presenting a symbol, which requires decoding and interpretation before any sense of spatial positioning or motion can be obtained from it. Peripheral vision on the other hand, is used naturally for sensing motion in everday situations, and does so by means of dedicated, "hard-wired" circuits which recognize line-like features in the peripheral visual field, and convey details about their movements to the centers of the brain responsible for motion perception. Thus any instrument which provides information about movement of the pilot and aircraft by means of his peripheral vision will make use of these dedicated circuits, and frees the pilot's concious thinking from the business of constantly interpreting symbols.

Since it is not practical to extend the size of the existing artificial horizon so that it can be viewed and perceived by the peripheral vision, one has to devise a means of overlaying the normal instrument panel with information which can be perceived subconsciously in the periphery. The most practical means known at present is to shine a line or bar of light from a projector onto the standard instrument panel, with means provided for causing the bar of light to move relative to the aircraft to indicate the position of the horizon.

One approach to providing a line of light or light bar in front of the pilot and observed by the peripheral vision is to be found in U.S. Pat. No. 4,083,239. A light source was mounted in a housing and one part of the housing was made to tilt and another to rotate thereby moving optical elements which combined to transmit a light bar in front of the pilot. Movement of the parts was related to the aircraft's gyro platform so that the light bar gave a display representing the true horizon at all times. Although this structure is acceptable in some applications, it is not practical in all aircraft primarily because the structure is quite bulky and will not fit readily into the cockpit of existing aircraft. The structure also suffered from the disadvantage that movement of mechanical parts in conditions of extreme temperature changes and acceleration forces compromised the use of the device in aircraft such as fighters.

The present invention is directed towards providing an artificial horizon device having reduced overall dimensions and which, where space requirements dictate, can be mounted with the light source remote from the cockpit so that only the projection head is contained in the cockpit.

There are two conflicting design criteria for a remote light source. In order to project a light bar which can be seen in sunlight, the light source must be powerful. Such a light source however tends to be undesirable both because of power usage and more importantly, because it is a safety hazard. Consequently to use a remote light source it is necessary to maximize the efficiency of light transmission from the light source to the projected light bar in order to get the needed light intensity from a light source of acceptable power. Paradoxically, the lightbar will be too intense in situations other than sunlight so that it is also desirable to provide some means of varying the intensity of the light bar.

In some applications the light source and projecting head could be mounted in the cockpit where space is available. However there is still the possibility that these parts have to be separated because there are two different design criteria for mounting the parts. Firstly the projection head must be attached rigidly to the aircraft in order to avoid positional errors of the light bar caused by vibration and acceleration forces. Secondly the light source should be mounted resiliently to limit the likelihood of vibration damage. With these diametrically opposed criteria satisfied, it is necessary to have a flexible, optical link between the light source and the projection head regardless of the fact that these parts could be immediately adjacent to one another.

Accordingly, the invention provides an artificial horizon device having a light source of limited power which can be positioned remotely from the aircraft cockpit. A scanning mechanism is mounted in the cockpit to receive light from the light source and to project a light bar representing the true horizon by scanning a projected light beam along the perceived bar at a frequency sufficiently high that the bar is perceived as a continuous projection.

The invention will be better understood with reference to the following description taken in combination with the accompanying drawings in which.

Figure 1:
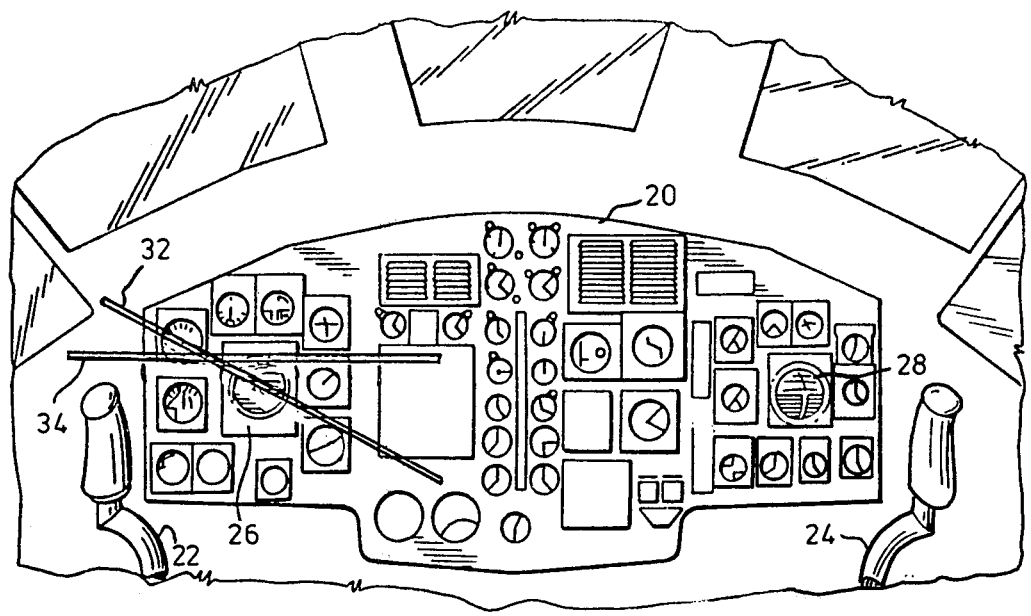
FIG. 1 is a representation of an aircraft cockpit showing two positions of a light bar projected in front of one of the pilots in accordance with the invention.

Reference is first made to FIG. 1 which illustrates an instrument panel 20 for use by a pilot and co-pilot who will sit behind the respective controls 22, 24. The instruments to the left of the centre of the panel are generally duplicated to the right so that either one of the pilot and co-pilot can control the aircraft. The instrument panel includes duplicate artificial horizon instruments 26, 28 which are normally found in an instrument panel of this type and which advise the pilot of the pitch and roll of the aircraft relative to a horizontal plane. These instruments are relatively small and must be viewed carefully by the pilot using central vision so that the pilot must avert his eyes from the windshield and from other instruments while he concentrates on the artificial horizon instrument.

FIG. 1 also illustrates two positions of a light bar created by a device according to the invention and which will be described with reference to subsequent Figs. Two positions are indicated by numerals 32 and 34. In position 32, the light bar is centered on the horizon instrument 26 which acts as a datum in this particular arrangement. Consequently, the aircraft is maintaining level flight with left wing down. By contrast, the light bar 34 indicates that the aircraft has its nose down in a descent while travelling with wings level. This is apparent primarily because the instruments in the instrument panel 20 are framed in rectangles having horizontal and vertical sides. Consequently, the arrangement lends itself to indicate whether or not the light bar is horizontal with respect to the panel 20 and hence whether or not the aircraft is rolling. Similarly, the fact that the light bar 32 is inclined with respect to the instruments indicates that the aircraft is rolling and in which direction. In some aircraft, the instruments will not have rectangular faces but they are generally arranged in a row which is horizontal. In the unlikely event that the aircraft with which the device is to be used does not have instruments in such an arrangement, then the datum would have to be added to the instrument panel. This would have to be done in the form of a line or series of lines extending horizontally in the instrument panel with a particular line indicating that the aircraft is in level flight.

It will be evident that two light bars must be provided in an aircraft if the co-pilot is also to use the light bar. This is because a light bar which extended across the whole instrument panel would tilt down at one side and up at the other side when the aircraft rolled and consequently the pilot and co-pilot will have different information from the light bar. Two light bars can be provided either by using two peripheral horizon devices of the types to be described or by using one such device with suitable optics which either splits the light into two images or which allows the light bar to be focussed either in front of the pilot or in front of the co-pilot.

Figure 2:
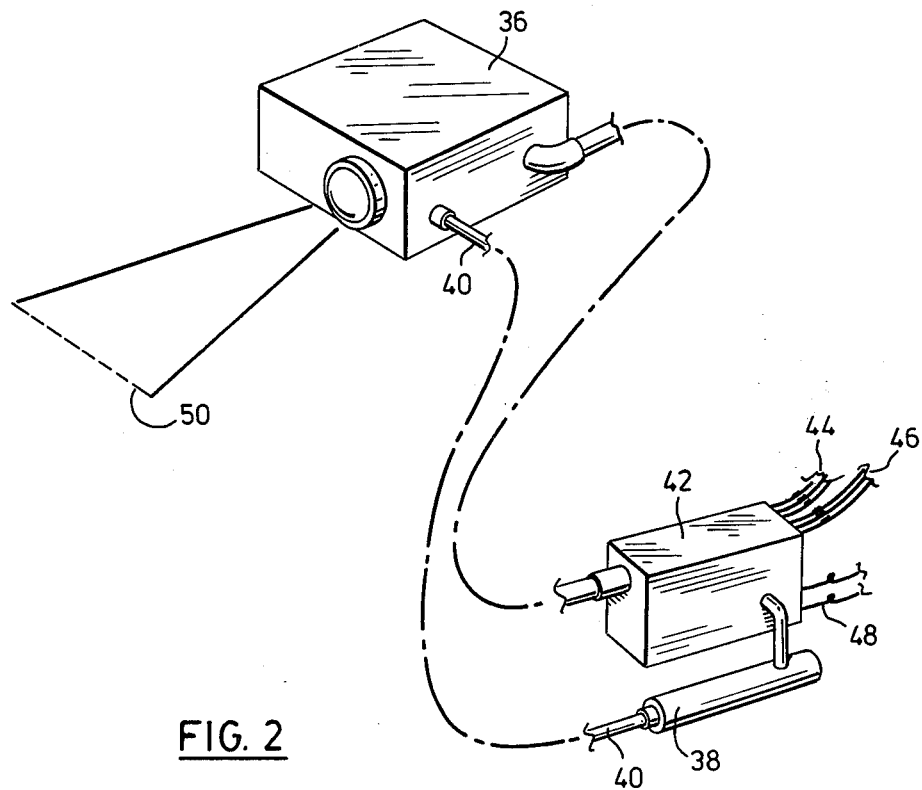
FIG. 2 is a diagrammatic view illustrating the physical relationships between the major components of a preferred embodiment of an artificial horizon device according to the invention.

Reference is next made to FIG. 2 which shows diagrammatically the major components of a preferred embodiment of artificial horizon device according to the invention.

A projection head 36 receives light from a laser source 38 via a flexible connection 40 which includes an optical fiber as the light conductor as will be described. The laser source 38 is driven from a control circuit contained in a housing 42 which receives input signals from the aircraft gyro platform via three inputs 44 carrying information related to the roll of the aircraft, and from three connectors 46 relaying information about the pitch of the aircraft. A power input 48 is also provided and, as will be described, the control circuit is connected to the projection head 36 to drive scanners which use the information originating from the gyro platform to control the positon of the light bar so that the pilot sees a continuous display 50 representing the true horizon.

Figure 3:
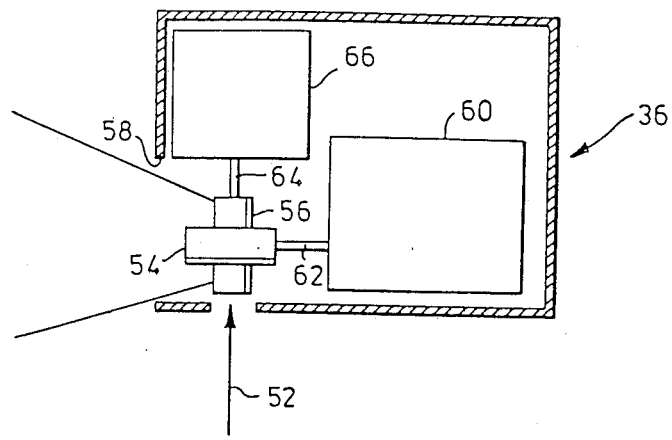
FIG. 3 is a diagrammatic sectional view of a projection head.
Figure 4A:
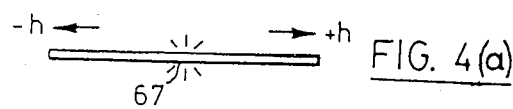
FIG. 4 is a series of six diagrams labelled (a) to (f) and illustrating various positions of a light bar relative to a datum point.
Figure 4B:
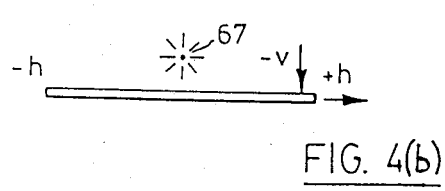
Figure 4C:
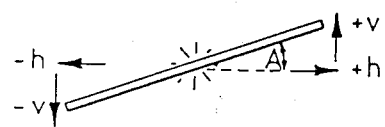
Figure 4E:
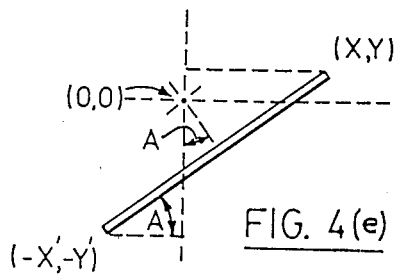
Figure 4D:
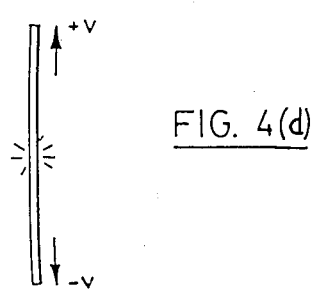
Figure 4F:
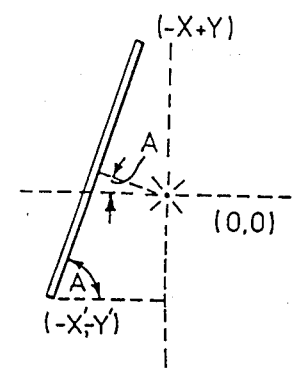

The major internal parts of the projection head 30 are illustrated in the sectional view FIG. 3 where it will be seen that light entering in the direction of arrow 52 from the connector 40 (FIG. 2) inpinges on a first inclined mirror 54. This mirror normally lies in a plane at about 45 degrees to the direction of the lightbeam 52 so that light reflected by the mirror inpinges on a second mirror 56 which also lies at about 45 degrees to the direction of the light passing between the mirrors. The mirrors are arranged co-operatively to provide an output from the projection head leaving via an aperture 58 to provide the light bar 50 (FIG. 2).

The first mirror 54 forms part of a first scanner mechanism 60 having a rod 62 to which the mirror is attached for movement with the rod about the axis of the rod. Similarly, the second mirror 56 is attached to a rod 64 forming part of a second scanning mechanism 66. As will be described the scanning mechanisms 60, 66 are driven independently to cooperate optically so that the inpinging beam 52 is caused to scan thereby creating the light bar seen by the pilot. The position of the light bar is dictated by the scanning of these mirrors as will now be described.

As seen in FIG. 4, six individual positions of light bar are identified by the letters "a" to "f". It will be seen in diagram (a) that a light bar is represented in a position located centrally over a reference point. In order that the light bar appear before the pilot, the light projected from the projection head 36 (FIG. 2) must scan at a frequency sufficient to deceive the pilot into believing that the line is solid. The frequency used in the preferred embodiment is 40 cycles per second. Consequently, as indicated in diagram (a) of FIG. 4, the light scans between values of "h" indicated with reference to a zero position 67. Should the aircraft begin to climb to gain attitude, the light bar will move downwardly with reference to the datum point creating a negative value of "v" as indicated in diagram (b). It will therefore be evident from diagrams (a) and (b) that a light bar can be created with the aircraft exhibiting zero roll by scanning using the first mirror 54 and by positioning the second mirror 56 to show any vertical displacement related to pitch. However, should the aircraft roll with right wing down and zero pitch, the light bar would take up a position shown in diagram (c) and this light bar can be created only by moving the mirrors 54, 56 (FIG. 3) synchronously so that first mirror 54 represents horizontal movement and the second mirror 56 moves in relation to vertical movement. In effect, any one point on the light bar is obtained as the result of moving the first mirror through an angle corresponding to the cosine of angle A whereas the second mirror causes movement corresponding to the sine of this angle. With the mirrors moving synchronously, the angle of the light bar relative to the horizontal (angle A) is obtained simply by varying the relationship of the magnitudes of the signals to the scanning mechanisms 60, 66 with which the movements of the mirrors 56 are sympathetic.

The first three diagrams of FIG. 4 illustrate use of the first mirror to scan the light bar with the first mirror doing all of the scanning in diagram (a). Diagram (d) shows the situation which arises when the aircraft rolls through 90 degrees. At this point the first mirror is stationary and the second mirror is causing the scanning of the light beam. In effect, this position is a natural progression from the positons shown in diagrams (a) and (c) with the aircraft rolling past the position shown in diagram (c) and into the position shown in diagram (d). A complication arises when the aircraft both rolls significantly and pitches. It is evident from the previous diagrams tha both mirrors must be brought into play to move the light in response to roll. However both mirrors must also be brought into play to reflect pitch. This can be made evident by a comparison of diagrams (b) and (d). In diagram (b) all of the pitch is shown by a set position of second mirror 56. If the light bar shown in diagram (d) were to move in response to pitch, then this movement would result from adjusting the first mirror 54. Consequently in any positions between these two extremes, pitch must be reflected by a combination of movement involving both mirrors. As seen in diagram (e), co-ordinates are shown for the ends of the light bar related to the datum point. It will be seen by comparing diagrams (e) and (f) that the light bar can take positions where the co-ordinates at one end are positive whereas at the other end they are negative; and other positions are possible such as that shown in diagram (f) where three of the coordinate values are negative whereas one is positive. Other situations are obviously possible should the aircraft roll through 360 degrees while also pitching.

In order to introduce pitch into the scanning mechanisms 60, 66, the light bar is considered to move with reference to the datum point on two co-ordinates. For instance in diagram (e) the centre of the light bar has moved along the horizontal axis by a distance equal to the pitch multiplied by sine A. Similarly, vertical displacement is equal to the pitch multiplied by cosine A. By taking both pitch and roll into consideration, a point such as that at the upper end of the light bar of diagram (e) (as drawn) would have coordinates as follows:

$X = $ Constant $\times$ Cosine A + Pitch sine A
$Y = $ Constant $\times$ sine A + Pitch $\times$ cosine A Because cosine A is negative, the vertical value for pitch will be deducted from the first value in the opposite direction related to roll. A similar result will be obtained using diagram (f).

It is evident that the first mirror causes scanning in the horizontal or X direction and that the second mirror correspondingly scans in the vertical or Y direction. The foregoing equations indicate that the scanning mechanisms 60, 66 are controlled by individual signals each of which is made up of two parts related firstly to roll and secondly to pitch (as shown in the equation ). Evidently the control circuit contained in the housing 42 (FIG. 2) must be capable of analyzing signals from the gyro platform connectors 44, 46 and translating these analyzed signals into inputs for the scanning mechanisms 60, 66. Before describing the central circuit, the mechanical connectors used to attach the flexible connector at its ends will be described to complete the description of the mechanical components.

Figure 5:
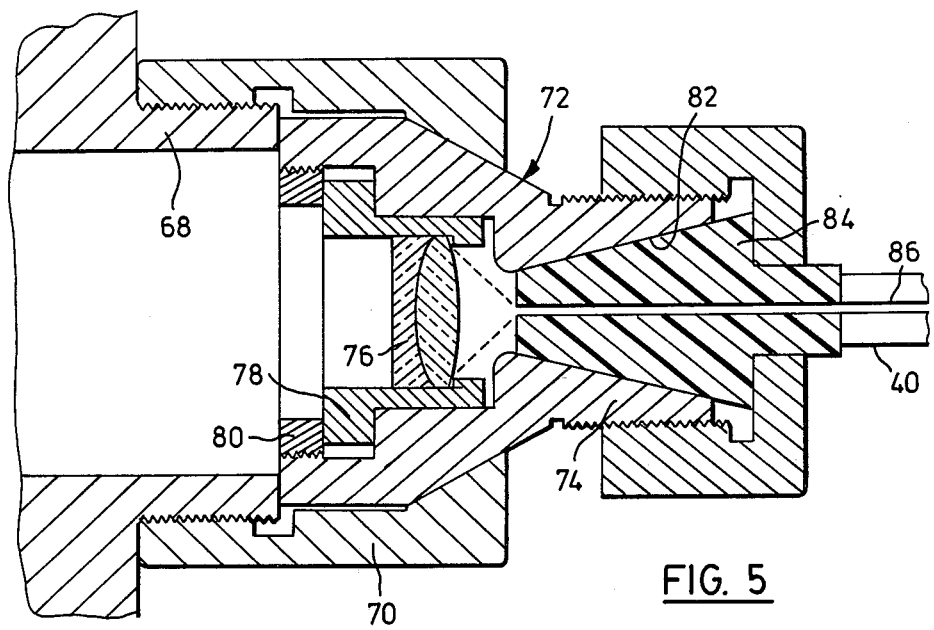
FIG. 5 is a sectional view to an enlarged scale of the termination used to connect an optical fiber.

Reference is next made to FIG. 5 which illustrates a connector used to attach the flexible connector 40 to the laser 38. As drawn, the left end of the connector attaches to a threaded cylindrical projection 68 on the laser source 38 using a threaded ring 70 which in turn has an internal conical portion adapted to engage an external conical portion 72 of an intermediate element 74. The ring 70 is therefore capable of drawing the intermediate element 74 into firm aligned engagement with light leaving the laser source on the axis of the intermediate element. The light proceeds as a substantially parallel beam meeting the focussing lens system 76 which is contained within a lens mounting 78 and this in turn is held in place by a ring 80 which is threaded externally for engagement in threads provided for the purpose in the lens mounting 78. At the other end of the intermediate element 74, an internal outwardly diverging and conical surface 82 is provided for receiving an end piece 84 of a type such as that known as an "AMPHENOL Precision Fiber Optic Connector" and which is attached to the flexible connector 40 and has an optical fiber 86 which terminates at an accurately predetermined position in the end of the end piece 84 so that light focused by the lens system will enter this end of the fiber 86 for conduction to the projection head 36 (FIG. 2). The coupling showing FIG. 5 is typical also of the coupling at the opposite end of the flexible connector 40, the difference being that the lens system at the other end is chosen to accept light diverging from the fiber 86 and to collimate this light.

In the preferred embodiment the optical fiber 86 is a single fiber having a diameter of 50 micron. This fiber is chosen as a compromise between the requirements at opposite ends of the connector 40 and also taking into consideration the minimum strength requirements of the connector. At the end shown in FIG. 5, the end of the fiber must obviously be placed accurately if all of the light emanating from the laser source is to be focussed into the end of the fiber. It is essential that if the power of the laser source is to be kept to a minimum to satisfy power and safety requirements, then as much of the light as possible must be transmitted without loss. It has been found that this arrangement is capable of transmitting the light with losses in the order of 2 to 3 db.

At the end of the flexible connector attached to the projection head, divergent light from the optical fiber must be kept to a minimum in order to minimize off-centre optics problems. If the light is to be collimated then the lens systems must be capable of accepting diverging light and collimating this light accurately. While this cannot be achieved absolutely, collimation is improved if the angle of divergence of light leaving the fiber 86 is kept to a minimum. Also in order to minimize transmission losses, a graded-index fiber if preferred.

With the above in mind, it will be appreciated that the fiber 86 is a compromise because at the input end shown in FIG. 5 it would be simpler to have a large fiber whereas at the output end the fiber should be as small as possible to minimize divergence.

Figure 6:
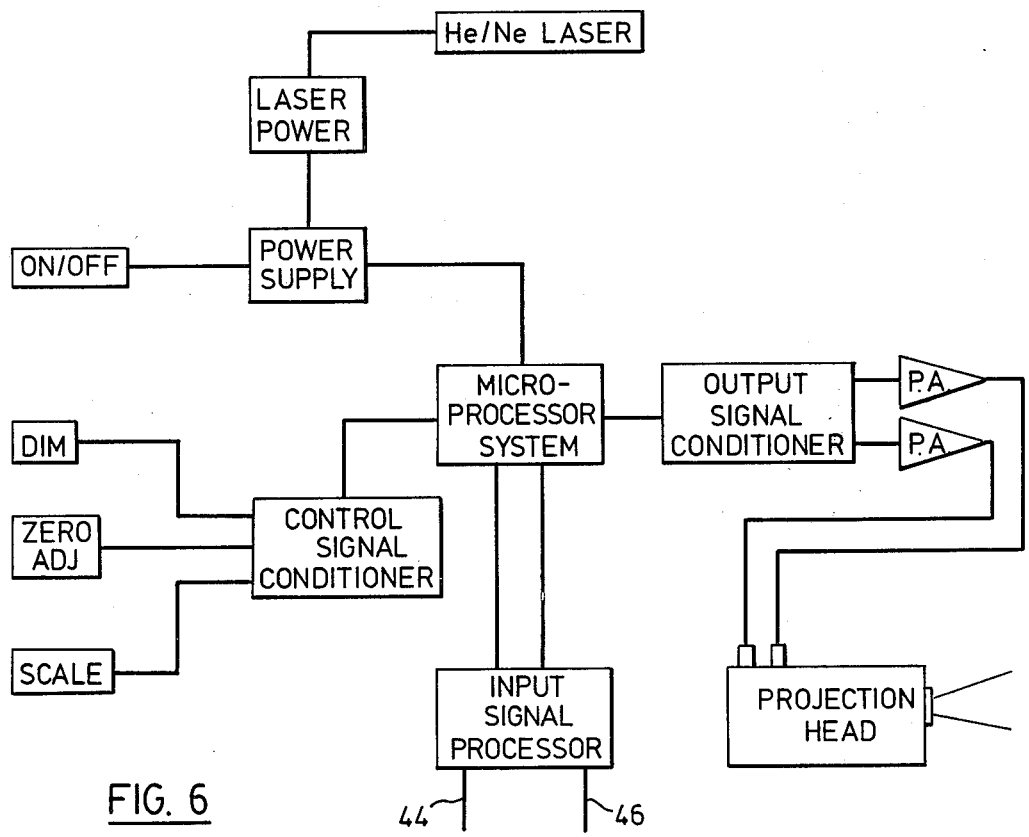
FIG. 6 is a schematic representation of a control circuit forming part of the peripheral horizon device.

Reference is next made to FIG. 6 to more fully explain the control system which is capable of accepting signals from the aircraft gyro platform and processing these signals to drive the scanning mechanisms 60, 66.

As seen in FIG. 6, input signals 44 and 46 are received at an input signal processing device which converts these signals into two digital outputs, a first of which represents pitch and a second of which represents roll. These signals are received by a microprocessor system which receives input from the control signal conditioner. This provides the pilot the facility of dimming, adjusting zero, and varying the scale. All of these signals are conditioned and forwarded to the microprocessor system for combining with the signals from the input signal processor to provide digital signals to an output signal conditioner which in turn provides separate pitch and roll information for the scanning mechanisms 60, 66 as described with reference to FIG. 4. Power amplifiers are placed as indicated in the signal lines to the scanners.

A power supply is also provided with the necessary on-off switch and this is coupled both to a laser power supply and to the system. A helium-neon laser having a power output of two to four milliwatts is preferred.

It will be evident with the control circuit shown in FIG. 6, that the capacity of the microprocessor system can be changed and that this permits a simple change to be made to the device described so far. For the purposes of explanation, a simplified device is being described which is acceptable to show pitch and roll. However in a preferred embodiment, it is possible to change the intensity of the light bar for different conditions in the cockpit. In bright sunlight the light bar should be as bright as possible whereas at night, significant dimming should be used. The microprocessor system permits this improvement so that the difference between a device without the dimming characteristic and one with it would be that the microprocessor system is different.

Figure 7:
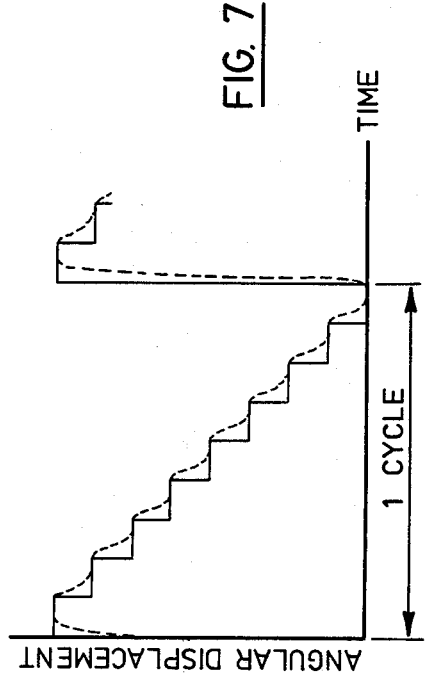
FIG. 7 is a graphical representation illustrating a control signal used in providing a preferred light bar consisting of a series of bright spots.

Reference is next made to FIG. 7 to describe a preferred approach to dimming. This Figure illustrates a typical waveform fed to one of the scanners to cause the mirror to deflect the light along a path dependent upon the attitude of the aircraft. As seen in FIG. 7, the mirror begins a cycle at a maximum angular displacement and then as time progresses, it moves in a series of steps towards the end of the cycle where it again returns to commence scanning once more. The solid lines in FIG. 7 illustrate the wave form fed to the scanner and the broken line illustrates the movement of the mirror which of course lags behind the wave form due to inertia characteristics. Nevertheless, it will be appreciated that because the mirror spends some time stationary between each step, it will project light which appears as a dot during the stationary portions of the cycle and that in between the dots, there will be a very faint light linking the dots which may in fact not be seen at all by the pilot. This is because the intensity of illumination is dependent upon the speed of scanning. Where the scanning is stopped momentarily, there will be an area of maximum illumination.

Figure 8:
FIG. 8 is a view similar to FIG. 7.

It has been found that the human eye associates a row of seven or more dots as a straight line and this procedure permits the provision of a line of maximum intensity of nine discrete dots. If it is desired to dim the light bar slightly, the pilot can operate the dimmer control which affects the number of steps in the cycle. A suitable variation would be to go from nine dots to seventeen, to thirty-three, to sixty-five and then to a solid line. Further dimming can be provided by parking the light beam for a period of the cycle as illustrated in FIG. 8 where it will be seen that the cycle consists of a series of steps followed by an angular displacement greater than that permitting light transmission. Above this limit the light is contained within the projection head by a trap without extending the cycle time. Consequently, although the number of steps may be similar to those used in FIG. 7, each step is shorter and therefore dimmer. By a combination of parking and varying the number of steps in the cycle, a 13 db intensity drop is provided typically without the parking, and to a further 13 db intensity drop is provided using the parking.

An alternative approach to the use of parking to facilitate dimming would be to use a simple filter which is placed in the ligh path after dimming from nine spots to a full line. With the filter in place, the projection head would project nine spots again, and proceed through the stages to a full line thereby in effect repeating the series of dimming stages but with the filter in place.

Figure 9:
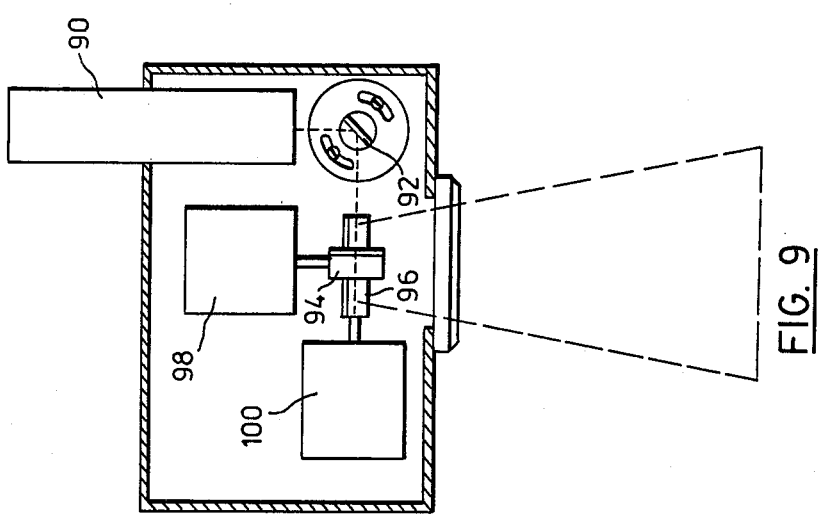
FIG. 9 is a view similar to FIG. 3 and illustrating an alternative embodiment of the invention.

The foregoing embodiment is intended for use wherever either one of two criteria dictates separation of the light source from the projection head, namely: space limitations in the cockpit; and mounting requirements for the light source requiring resilient mounting. However where these criteria are not applicable, a combination light source and projection head could be preferred. As seen in FIG. 9, such a structure corresponds generally to FIG. 3 but in place of light entering at 52 (FIG. 3) from a remote source, a laser source 90 is provided locally to project a beam on to a mirror 92 which directs the light to the first of two mirrors 94 and 96. These mirrors are associated with scanners 98 and 100 which operate in the same fashion as those described with reference to the other embodiment.

These and other embodiments are within the scope of the invention as defined in the following claims.

We claim:

1. An artificial horizon device for use in projecting a light bar in front of an aircraft pilot such that the light bar provides a continuous visual display of the actual horizon relative to the aircraft, the device comprising:

first means adapted to be coupled to the output of the aircraft gyroscope providing roll information and to convert this output to two synchronous roll outputs having waveforms in a first condition in phase and in a second condition 180 degrees out of phase with one another, the first such roll output having a value which is a function of the cosine of the instantaneous angle of roll of the airplane, and the second such roll output being a function of the sine of the same angle so that the composite plot of values from these outputs would be a straight line defining with a reference line the angle of roll, in the first condition the line having a positive slope and in the second condition the line having a negative slope;

second means adapted to be coupled to the output of the aircraft gyroscope providing pitch information and to convert this output to a pitch output which is in direct proportion to the angular pitch;

means mixing the two roll outputs with the pitch output to provide first and second composite outputs, the instantaneous values of which are respectively functions of the sum of the first roll output and the product of the pitch output and the sine of the angle of roll, and of the sum of the second roll output and the product of the pitch output and the cosine of the angle of roll;

a light source providing a light beam;

first and second mirrors mounted for oscillatory movement about respective datums, the mirrors including drive means coupled to the respective first and second composite outputs and responsive to these outputs to move the mirrors, the light beam being reflected by the first mirror through about 90 degrees and this reflected light being reflected by the second mirror through about another 90 degrees whereby the mirrors combine to project a light bar positioned with reference to a datum to indicate the position of the true horizon regardless of the orientation of the aeroplane.

2. An artificial horizon device as claimed in claim 1 in which the means providing the light beam is a laser.

3. An artificial horizon device as claimed in claim 2 in which the means providing the light beam further comprises an optical fibre, means focusing light from the laser on one end of the fibre, means collimating the diverging light leaving the other end of the fibre to provide the light beam which is incident on the first mirror.

4. An artificial horizon device as claimed in claim 1 and further including means adapted to change the intensity of the image perceived by the pilot.

5. An artificial horizon device as claimed in claim 1 and further including a trap located to retain a portion of the light emitted from the second mirror, and in which the control means causes a parking period between scans whereby during the parking period the beam of light is projected behind the trap and whereby during the scan the beam creates a dimmer image caused by the beam scanning during a shortened time period.

6. An artificial horizon device as claimed in claim 5 in which the control means causes the light to scan in a series of repetitive faster and slower movements so that the pilot perceives a series of bright areas of light along the line separated by areas of very low illumination.

7. An artificial horizon device as claimed in claim 1 in which the control means causes stepped movement of the first and second mirrors whereby the light bar consists of a series of areas of brighter intensity linked by areas of greatly reduced intensity.

* * * * *